US008000739B2

(12) United States Patent
Bajpai et al.

(10) Patent No.: US 8,000,739 B2
(45) Date of Patent: Aug. 16, 2011

(54) SINGLE NUMBER PRESENTATION FOR DUAL-MODE PHONES

(75) Inventors: Rajneesh Bajpai, San Jose, CA (US); Deepinder Setia, San Ramon, CA (US); Pradeep Iyer, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 518 days.

(21) Appl. No.: 11/955,104

(22) Filed: Dec. 12, 2007

(65) Prior Publication Data
US 2009/0156164 A1    Jun. 18, 2009

(51) Int. Cl.
H04B 1/38  (2006.01)
H04M 1/00  (2006.01)

(52) U.S. Cl. ............ 455/552.1; 455/555; 455/415; 455/554.1

(58) Field of Classification Search ........... 455/426.1, 455/426.2, 414.1, 432.1, 415, 411, 550.1, 455/552.1, 556.1, 417, 446, 422.1, 462, 554.1, 455/554.2, 555; 370/331
See application file for complete search history.

(56) References Cited

U.S. PATENT DOCUMENTS

| | | | |
|---|---|---|---|
| 6,445,921 B1 * | 9/2002 | Bell | 455/426.1 |
| 6,614,786 B1 * | 9/2003 | Byers | 370/353 |
| 6,975,602 B2 | 12/2005 | Anderson | |
| 7,035,260 B1 | 4/2006 | Betta | |
| 7,308,263 B2 | 12/2007 | Gallagher et al. | |
| 7,565,145 B2 | 7/2009 | Gallagher et al. | |
| 7,606,190 B2 | 10/2009 | Markovic et al. | |
| 7,768,977 B2 | 8/2010 | Camp, Jr. | |
| 2002/0111198 A1 | 8/2002 | Heie | |
| 2006/0023658 A1 | 2/2006 | Phillips et al. | |
| 2006/0058050 A1 | 3/2006 | Park | |
| 2006/0223555 A1 | 10/2006 | Kim | |
| 2006/0239277 A1 | 10/2006 | Gallagher | |
| 2007/0149176 A1 | 6/2007 | Wells et al. | |
| 2007/0165825 A1 * | 7/2007 | Ko et al. | 379/219 |
| 2007/0207804 A1 | 9/2007 | Sharma et al. | |
| 2007/0268858 A1 | 11/2007 | Soto | |
| 2008/0085728 A1 | 4/2008 | Reding | |
| 2008/0112392 A1 * | 5/2008 | Mansfield | 370/352 |
| 2010/0105379 A1 | 4/2010 | Bonner et al. | |

OTHER PUBLICATIONS

H. Schulzrinne et al., "RTP Payload for DTMF Digits, Telephony Tones and Telephony Signals", Network Working Group, May 2000, 1-30.
R. Mahy et al., "A Message Summary and Message Waiting Indication Event Package for the Session Initiation Protocol (SIP)", Network Working Group, Aug. 2004, 1-19.
S. Bellovin et al., "Security Mechanisms for the Internet", Network Working Group, Dec. 2003, 1-20.

(Continued)

Primary Examiner — John Lee
(74) Attorney, Agent, or Firm — Blakely, Sokoloff, Taylor & Zafman LLP

(57) ABSTRACT

Providing a single number presentation to the party called by a dual-mode phone. The operation of the cellular side of a dual-mode phone is altered such that when the user attempts to place an outgoing call using the cellular phone, the call is redirected to a preprogrammed incoming phone number associated with the enterprise. When the enterprise PBX answers this call, the dual-mode phone transmits the desired number to the enterprise PBX. The enterprise PBX then places the call to the desired number, and in the process transmits the caller-id information assigned to the dual-mode phone.

21 Claims, 1 Drawing Sheet

OTHER PUBLICATIONS

H. Schulzrinne et al., "RTP: A Transport Protocol for Real-Time Applications", Network Working Group, Jul. 2003, 1-89.

J. Rosenberg et al., "SIP: Session Intiation Protocol", Network Working Group, Jun. 2002, 1-269.

United States Office Action dated Sep. 30, 2010 for U.S. Appl. No. 11/955,108, filed on Dec. 12, 2007 entitled Delayed ACK in Dual-Mode Call Handover.

United States Office Action dated Oct. 5, 2010 for U.S. Appl. No. 11/955,091, filed on Dec. 12, 2007 entitled Single Voicemail for Dual-Mode Phones.

United States Office Action dated Nov. 15, 2010 for U.S. Appl. No. 11/963,275, filed on Dec. 12, 2007 entitled Indicators for Dual-Mode Phones.

United States Office Action dated Mar. 2, 2011 for U.S. Appl. No. 12/168,756, filed on Jul. 7, 2008 entitled Enterprise Seamless Mobility.

United States Office Action dated Apr. 26, 2011 for U.S. Appl. No. 11/963,275, filed on Dec. 12, 2007 entitled Indicators for Dual Mode Phones.

United States Office Action dated Mar. 23, 2011 for U.S. Appl. No. 11/955,108, filed on Dec. 12, 2007 entitled Delayed ACK in Dual-Mode Call Handover.

United States Office Action dated Mar. 29, 2011 for U.S. Appl. No. 11/955,091, filed on Dec. 12, 2007 entitled Single Voicemail for Dual-Mode Phones.

\* cited by examiner

SINGLE NUMBER PRESENTATION FOR DUAL-MODE PHONES

CROSS REFERENCE TO RELATED APPLICATIONS

The present application is related to (1) U.S. patent application Ser. No. 11/955,108 filed Dec. 12, 2007 and entitled "Delayed ACK in Dual-Mode Call Handover"; (2) U.S. patent application Ser. No. 11/963,275 filed Dec. 21, 2007 and entitled "Indicators for Dual-Mode Phones"; and (3) U.S. patent application Ser. No. 11/955,091 filed Dec. 12, 2007 and entitled "Single Voicemail for Dual-Mode Phones", all incorporated herein by reference.

BACKGROUND OF THE INVENTION

The present invention relates to the operation of dual-mode phones, and more particularly, to presenting a single number to the party called by a dual-mode phone.

Dual-mode phones support connections via Wi-Fi and cellular networks. In an enterprise environment, when the user of a dual-mode phone places a call through the enterprise Wi-Fi connection, the called party receives caller-id information from the enterprise. When the user of the dual-mode phone is away from the enterprise Wi-Fi network and places a call through the cellular side of the dual-mode phone, the called party receives completely different caller-id information.

BRIEF DESCRIPTION OF THE DRAWINGS

The invention may be best understood by referring to the following description and accompanying drawings that are used to illustrate embodiments of the invention in which.

DETAILED DESCRIPTION

Figure 1:
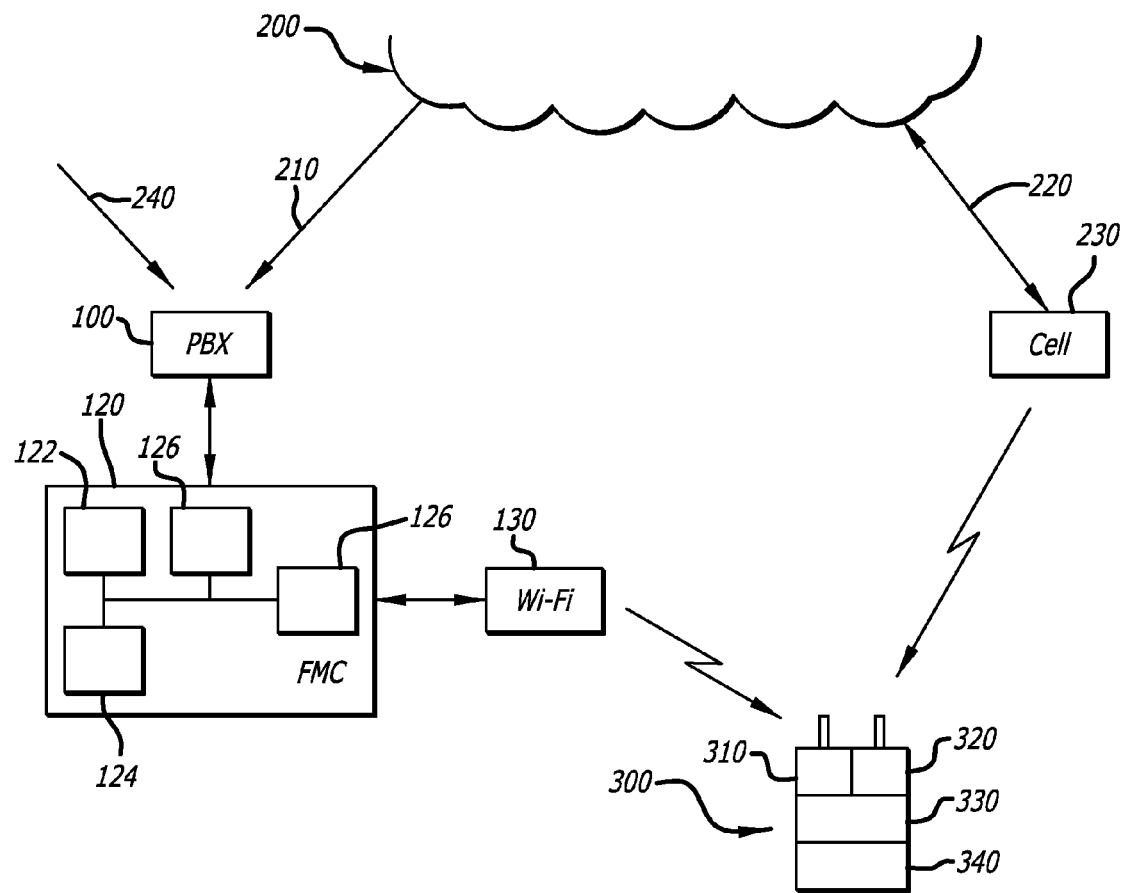
FIG. 1 shows a dual-mode phone in a network.

Embodiments of the invention relate to dual-mode phones, and to providing a single number presentation to the party called by a dual-mode phone. The operation of the cellular side of a dual-mode phone is altered such that when the user attempts to place an outgoing call using the cellular phone, the call is redirected to a preprogrammed incoming phone number associated with the enterprise. When the enterprise PBX answers this call, the dual-mode phone transmits the desired number to the enterprise PBX. The enterprise PBX then places the call to the desired number, and in the process transmits the enterprise caller-id information assigned to the dual-mode phone.

FIG. 1. shows an embodiment of the invention including a dual-mode phone. Enterprise SIP PBX communicates 210 with public switched telephone network (PSTN) 200. SIP PBX 100 also communicates with fixed mobility controller (FMC) 120. Mobility controller 120 bridges the worlds of SIP PBX 100 and Wi-Fi network controller 130. SIP PBX 100 and fixed mobility controller 120 communicate for example using protocols established by RFC 3261, RFC 2833, and RFC 3631, incorporated herein by reference. Voice streams are typically encoded using the RTP protocols defined by RFC 3550, incorporated herein by reference.

As understood in the art, such a hardware platform as shown in FIG. 1 for hosting mobility controller 120 includes a central processing unit (CPU) 122 connected to memory hierarchy 124, and to one or more interfaces 126. In one embodiment, CPU 122 is a MIPS-style CPU such as those from Raza Microelectronics or Cavium Networks, although CPUs from other companies such as Intel, AMD, Freescale, or the like may also be used. Memory hierarchy 124 includes read-only memory for system initialization, high-speed read-write memory such as DRAM, and bulk memory such as a hard disk or compact flash storage for files. Interfaces 126 include wired and wireless Ethernet interfaces as are known to the art. Controller 120 typically operates under the control of an operating system such as Linux, hosting software processes which provide device functionality. Additional hardware may be provided to provide for high-speed packet handling, crypto processing, and the like. While FIG. 1 shows mobility controller 120 and Wi-Fi-network controller 130 as separate entities, it should be noted that they may also be software processes running on a shared hardware platform. As an example, a single hardware platform based on a multi-core MIPS processor such as those from Raza Microelectronics or Cavium Netorks could host the functions of Wi-Fi network controller 130 along with mobility controller 120 and additional functions such as intrusion detection and/or firewalls.

Dual-mode phone 300 has first radio subsystem 310 for Wi-Fi communications such as to Wi-Fi network controller 130. Dual-mode phone 300 also has second radio subsystem 320 for communicating with cellular network 230 and through public switched telephone network 200. As is common with many such devices, dual-mode phone 300 is a digital device operating under control of CPU 330 through programs and data stored in memory hierarchy 340. Other aspects of dual-mode phone 300 such as speakers, microphones, power and display, keyboards and the like are understood by those in the art, and are not shown.

In operation, when dual-mode phone 300 wishes to initiate a call through Wi-Fi connection 310, mobility controller 120 through Wi-Fi network controller 130 signals PBX 100 to place the call through public switched telephone network 200. In so doing, PBX 100 provides the enterprise caller-id information associated with dual-mode phone 300 to PSTN 200 and the called party.

When dual-mode phone 300 is out of range of the enterprise Wi-Fi network and places a call using the cellular 320 side, through cellular network 230, the caller-id information received by the called party will be that provided by the cellular network. According to an embodiment of the present invention, dual-mode phone 300 is modified such that when the user attempts to place a call using cellular network 230, the destination number is stored temporarily in memory hierarchy 340. A cellular call is then placed to a predetermined number assigned to enterprise PBX 210. When this call is received at PBX 100, it also receives caller-id information identifying and authenticating dual-mode phone 300. If the caller-id information indicates that the incoming call is from an authorized user, such as by comparing the caller-id information to a list of allowed numbers, the incoming call is routed to mobility controller 120, which has previously been registered with PBX 100 as a SIP back to back user agent (B2BUA) as described in RFC 3261, incorporated herein by reference.

When the call from dual-mode phone 300 is passed to mobility controller 120, the controller receives the incoming caller-id information (the cellular number of the dual-mode phone) identifying dual-mode phone 300, and then receives the destination (called party) number information as transmitted by dual-mode phone 300. This destination number can be transmitted by dual-mode phone 300, for example, using DTMF tones, and received by mobility controller 120 using packetized DTMF tones as described in RFC 2833 incorporated herein by reference. Mobility controller 120 then uses this number to initiate a PSTN call through SIP PBX 100, retrieving and using the enterprise caller-id information associated with dual-mode phone 300. When that outgoing call is established, mobility controller 120 connects the incoming cellular call from dual-mode phone 300 to the outgoing call just established, thus providing the destination number with the enterprise called-id information.

It may be desirable to place certain cellular calls directly, such as to emergency services (911), information services, and the like. Such numbers may be recognized by the software operating dual-mode phone 300, as with 911 or other emergency services numbers, or a prefix may be provided to direct the software in dual-mode phone 300 that the number should be called directly, and not rerouted.

In additional embodiments of the invention, various techniques may be used to frame or encode the destination number to provide for robust transmission and/or error detection. In one example, the digit sequence may be framed by transmitting "#<number of digits>*<digit sequence>#" from dual-mode phone 300 to mobile controller 120. Other techniques such as the use of check digits or repeating digits may also be used. Dual-mode phone 300 may also repeat the transmission of the digit sequence, which may include framing or check digits as discussed. Authentication codes may also be added or included in the check sequence. The digit sequence may be repeated a specified number of times, or for a predetermined period of time.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A method of operating a dual-mode phone comprising:
    detecting an attempt to place a call through a cellular connection to a target number;
    storing the target number;
    initiating a cellular connection to a predetermined number in lieu of the target number, the predetermined number being different than the target number and assigned to a private branch exchange that is part of a wireless network; and
    once connected, transmitting the stored target number to a controller that is adapted to (i) receive the target number, (ii) identify the calling dual-mode phone, (iii) retrieve caller-id information associated with the dual-mode phone, (iv) call the target number and supply the caller-id information associated with the dual-mode phone, and (v) establish an audio connection between the dual-mode phone and the device associated with the target number.

2. The method of claim 1 wherein the transmitting of the stored target number includes encoding digits comprising the stored target number.

3. The method of claim 2 wherein the encoding of the digits comprising the stored target number comprises adding framing.

4. The method of claim 2 wherein the encoding of the digits comprising the stored target number comprises adding check digits.

5. The method of claim 1 wherein prior to initiating of the cellular connection, the method further comprises determining if the target number is a specific number and initiating a cellular connection using the target number if the target number is identical to the specific number.

6. The method of claim 5 wherein the specific number is a telephone number for emergency services.

7. The method of claim 5 wherein the specific number is a telephone number for information services.

8. The method of claim 2 wherein the encoding of the digits comprising the stored target number comprises adding authentication.

9. The method of claim 2 wherein the encoding of the digits comprising the stored target number comprises repeating digits.

10. The method of claim 1 wherein the transmitting of the stored target number is repeated a preset number of times.

11. The method of claim 1 wherein the transmitting of the stored target number is repeated for a preset period of time.

12. The method of claim 1 wherein the controller identifying the calling dual-mode phone comprises:
    retrieving the caller-id information associated with the incoming call from the dual-mode phone, and
    comparing the caller-id information against a list of authorized numbers.

13. A method of operating a dual-mode phone that includes a first radio subsystem for wireless fidelity (Wi-Fi) communications and a second radio subsystem for cellular communications, comprising:
    initiating a call from the first radio subsystem to a wireless network controller and a mobility controller when the dual-mode phone is in range to receive communications from the wireless network controller so that the mobility controller processes information within the call and provides a network caller identification associated with the dual-mode phone to a called party;
    detecting an attempt to place the call through a cellular connection to a target number;
    storing the target number;
    initiating a cellular connection to a predetermined number assigned to a device being part of the wireless network including the wireless network controller and the mobility controller in lieu of the target number, the predetermined number being different than the target number; and
    once connected, transmitting the stored target number to the mobility controller that is adapted to (i) receive the target number and caller identification information associated with the dual-mode phone, (ii) identify a calling party as the dual-mode phone, and thereafter, (iii) establish a call to the target number over the wireless network while supplying the network caller identification associated with the dual-mode phone to the called party.

14. The method of claim 13 wherein the detecting of the attempt to place the call through the cellular connection comprises:
    determining if the target number is a specific number; and
    initiating a cellular connection using the target number if the target number is identical to the specific number.

15. The method of claim 14 wherein the specific number is a telephone number for emergency services.

16. The method of claim 14 wherein the specific number is a telephone number for information services.

17. A dual-mode phone comprising:
    a first radio subsystem adapted to initiate a telephone call to a called party over a wireless fidelity (Wi-Fi) network;
    a second radio subsystem adapted to initiate a call over a cellular network, where
    in response to an attempt to place the call using the cellular network, the dual-mode phone (i) stores a phone number being a destination for the call, (ii) initiates a call to a predetermined number assigned to a device forming part of the Wi-Fi network in lieu of initiating the call over the cellular network, (iii) and providing the stored phone number and a caller-id information of the dual-mode phone so that a telephone call to the destination including a network caller-id information that corresponds to the caller-id information is initiated after the calling party is authenticated using the caller-id information.

18. The method of claim 17 wherein the caller-id information for the dual-mode phone being a cellular telephone number for the dual-mode phone.

19. The method of claim 17 wherein the network caller-id information is different than the caller-id information.

20. The method of claim 17 wherein the second radio subsystem is further adapted to detect an attempt to place a call to a phone number assigned for emergency services over the cellular network, and initiating a cellular connection using the phone number assigned for emergency services in lieu of routing the call to the Wi-Fi network.

21. The method of claim 17 wherein the second radio subsystem is further adapted to detect an attempt to place a call to a phone number assigned for information services over the cellular network, and initiating a cellular connection using the phone number assigned for information services in lieu of routing the call to the Wi-Fi network.

* * * * *